June 21, 1949.　　　　H. J. BEEMER　　　　2,473,631
SIGNALING DEVICE FOR VEHICLES
Filed Nov. 13, 1945　　　　　　　　　　　3 Sheets-Sheet 1
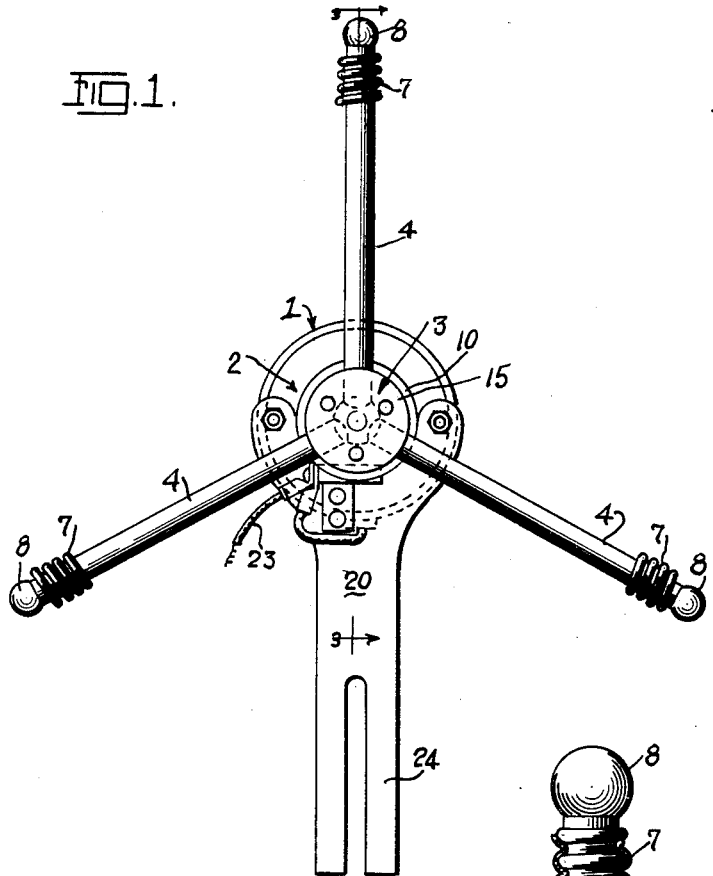
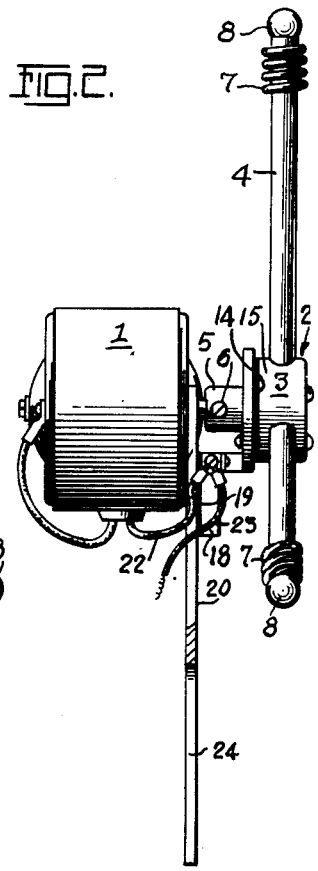
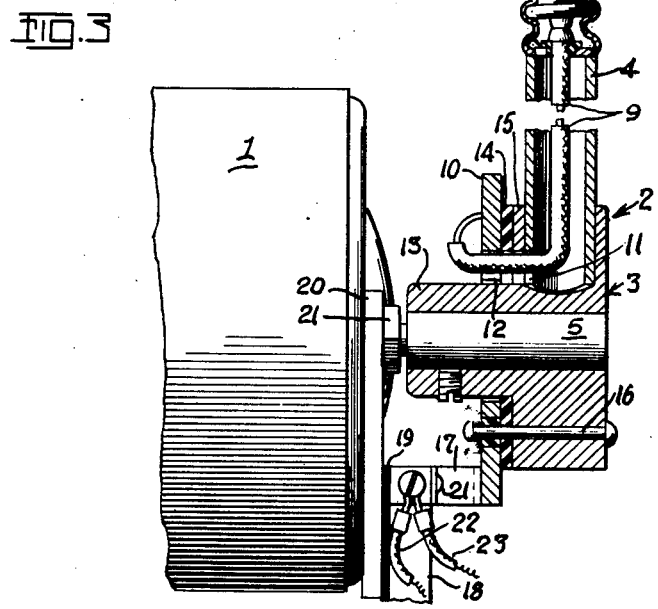
INVENTOR
HENRY J. BEEMER,
BY
Toulmin & Toulmin
ATTORNEYS

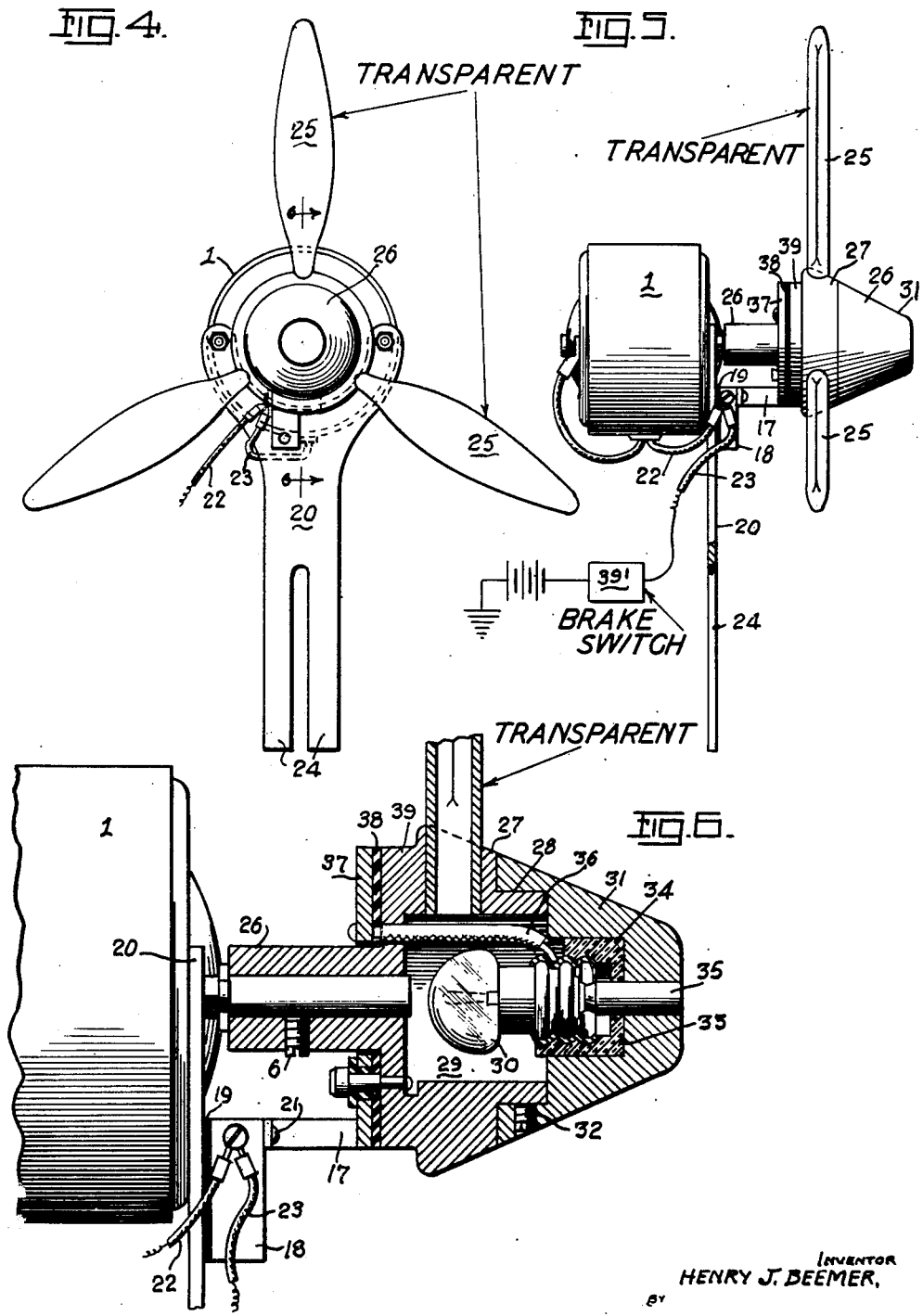

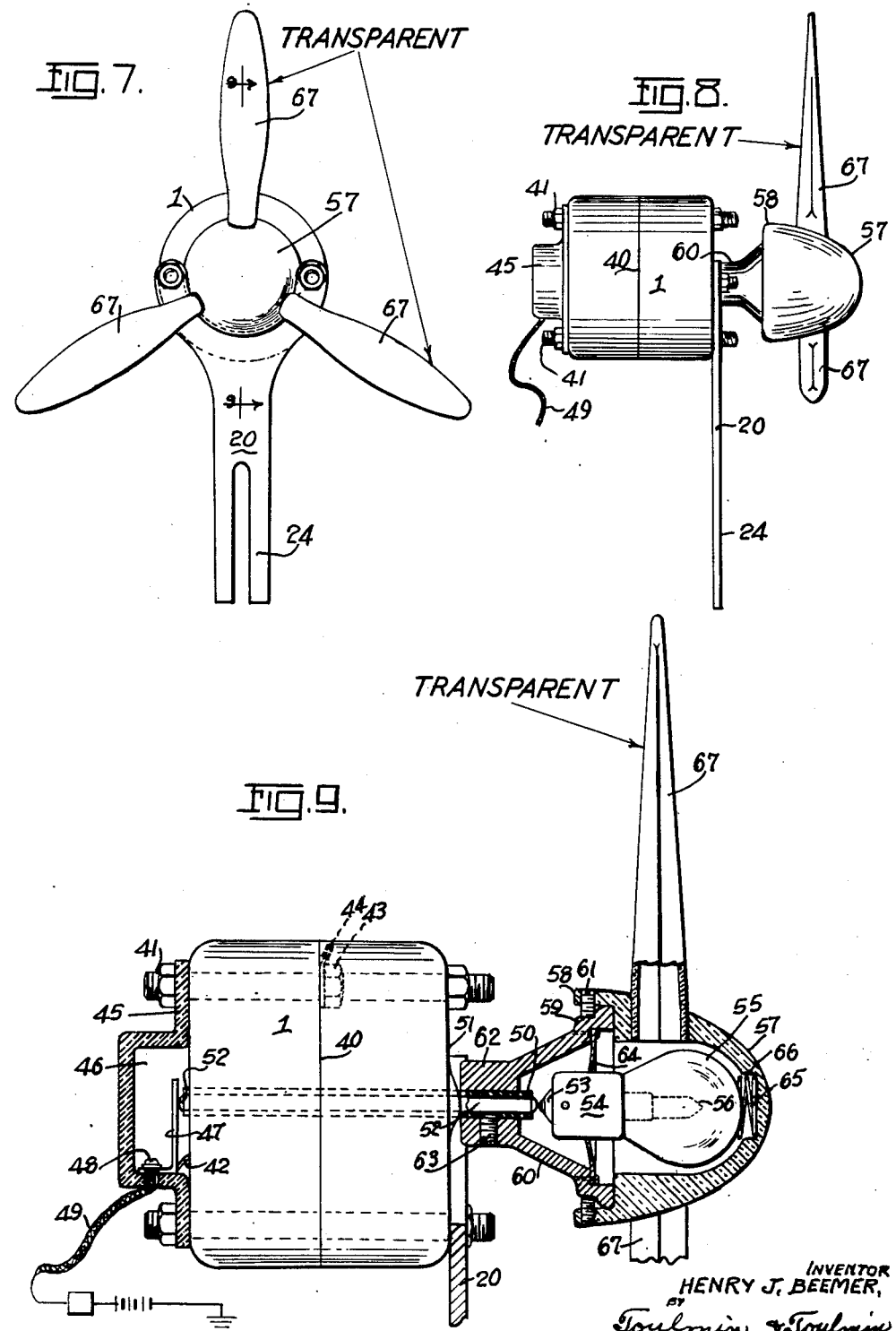

Patented June 21, 1949

EXAMINER 2,473,631

UNITED STATES PATENT OFFICE 2,473,631

SIGNALING DEVICE FOR VEHICLES

Henry J. Beemer, Sidney, Ohio

Application November 13, 1945, Serial No. 628,274

7 Claims. (Cl. 177—329)

The present invention relates to a signalling device for vehicles, more specially to a rotary stop light for motor vehicles. This application is a continuation in part of my abandoned application, Serial No. 553,928, filed September 13, 1944, and entitled "Pro-pel stop light."

Various types of stop lights have been proposed in the art and in general, most of them conform to a red light of restricted area comparable to a point source so that the maximum range of the light is relatively small. The light becomes even less discernible in fog and particularly when the brightness of the light becomes reduced due to a weak battery. Other types of stop signals employ swinging arms each of which carries a colored light at its end and a suitable type of actuator is employed to swing the arm through a predetermined arc. A signal of this type has some advantages over the stationary form of light, but even in this case the distance over which the light may be seen is relatively short due mainly to the small lighted area formed by the swinging light.

The primary object of the invention is to provide an improved signal light and more specially a rotary stop light for motor vehicles.

Another object is to provide a stop light of this character which when operating provides a relatively large lighted area which can be seen for considerable distance from the rear of the motor vehicle even under adverse weather conditions or when the lighting apparatus is not running at its full intensity.

Still another object is to provide an improved stop light in which the lighted area takes the form of a circular shape in which certain parts of the lighted area and preferably all parts emanate light rays of considerable intensity and at any predetermined color or series of colors.

Another object is to provide a rotary stop light of an inexpensive character, readily assembled or taken apart to replace the various elements and one which can be easily attached to a motor vehicle in place of the conventional form of stop light.

An additional object of the invention is the provision of a device of this character, wherein an electric motor operates a bladed wheel which is adapted to be illuminated when the motor is started so that it will effect a stop light for use on a vehicle, indicating that the latter is coming to a stop.

Another object is to provide a device of this character in which the motor and the lighting device are electrically controlled by a switch actuated by a brake pedal in the vehicle as is the case with the present day stop light.

Still another object of the invention is the provision of a device of this character wherein the rotary signalling action thereof lends greater attraction thereto than if it were stationary and in this manner being more effective for the purposes intended thereof, the device being novel and unique in its entirety and does not detract from the neat appearance of the vehicle when in use thereon.

The final object is to provide a rotary stop light of improved character which is simple in construction, thoroughly reliable and efficient in operation, strong, durable, and being adapted to be mounted at the rear of the vehicle, eliminating the possibility of rear end collisions between vehicles, and thus reducing accidents.

With these and other objects in view, the invention consists in the features of construction, combination and arrangement of parts as will be hereinafter more fully described and illustrated in the accompanying drawings which show the preferred and modified form of construction and pointed out in the claims hereunto appended.

In the accompanying drawings:

Figure 1 is an elevation of one form of the improved stop signal constructed in accordance with the invention.

Figure 2 is a side or end view thereof.

Figure 3 is a sectional view taken along line 3—3 in Figure 1 looking in the direction of the arrows.

Figure 4 is a view similar to Figure 1, but showing a modification.

Figure 5 is a side or end view of the modified structure.

Figure 6 is a sectional view taken along line 6—6 of Figure 4 looking in the direction of the arrows, the motor and bracket being shown in elevation.

Figure 7 is an elevated view of still another modified form of the improved stop light.

Figure 8 is a side or end view of the modification shown in Figure 7.

Figure 9 is a sectional view taken along line 9—9 of Figure 7 looking in the direction of the arrows.

Referring to the drawings in detail, particularly Figures 1 to 3, 1 designates generally an electric motor which receives its current supply through an electric wiring system installed within a motor vehicle (not shown) and this motor is controlled by a switch (not shown) actuated through use of the brake pedal, as in some electric stop lights now in use on motor vehicles. The motor 1 operates a rotary stop light designated generally at 2, and embodying some of the features of the present invention.

The stop light 2 comprises a multiple bladed or armed rotary member 3, the arms 4 of which are of tubular form, and extend radially outward from the wheel. For facility of construction, the tubular members 4, of which three have been shown for exemplary purposes are fitted snugly into openings which extend radially into the member of wheel 3 and to which they may be secured in any suitable and convenient manner. The latter is rigidly secured to the power shaft 5 of the motor 1, preferably by a set screw 6, the shaft being driven by the motor when it is desired for the stop light to be energized and actuated.

The outer ends of the blades or arms 4 are equipped with electric bulb sockets 7, preferably of a screw type, in which light bulbs 8 of any standard type are detachably screwed. The socket portion which receives the threads of each bulb is grounded through the metal arm 4 and the rotary member 3 while the other side of the bulb or plug portion is electrically connected through a conductor 9 to a contact ring 10. This conductor is conveniently taken through the center of each arm and then through a suitable opening indicated at 11 provided at the base of the element. The contact ring 10 may comprise a relatively thin circular metal plate having an opening indicated at 12 sufficiently large to clear the hub portion 13 of the member 3 so as not to make contact therewith. The ring 10 is secured in position to the member 3 through an insulated circular plate 14 which is interposed between the ring 10 and a shouldered portion 15 on the member 3. Bolts 16 may pass through the ring, but insulated therefrom, the bolts passing also through the member 3 to hold the plate or ring 10 rigidly in position.

The contact ring 10 has engaging therewith a resilient brush or shoe 17 carried on a base 18 of conducting material which is insulatingly supported as indicated at 19 from a hanger 20. This hanger also supports the motor casing 1 by means of bolts 21.

The motor may be of any suitable voltage, direct current type, readily operated from the usual storage batteries found in automobiles and generally employing a shunt field connected directly across the armature. One of the combined armature and shunt field leads 22 may terminate at the block 18 and a wire 23 is taken from this block to the usual stop light or brake switch which is under the control of either the pedal or hand operated braking lever. The other side of the switch is connected to the grounded terminal of the storage battery so that when either of the brake levers is applied, six volt energy is brought to the terminal block 18 and motor 1 is immediately started, assuming that one side of the motor armature and one lead of its field are grounded. Energy is also conducted through the brush 17 and thence to the rotating ring 10 where it is taken through the conductor 9 to the central plug of the lamp.

Consequently, as the motor is rotated when the brake pedal is pressed or the hand brake operated, the bulbs 8 are caused to rotate through a circumferential path to leave a lighted ring of a width somewhat greater than the diameter of the bulb. Inasmuch as the motor will rotate at fairly rapid speed and further, since a number of arms 4 are employed as carrying a bulb, the retentivity of the eye will obtain the impression of a solid, continuous, i. e. unbroken, ring of light of relatively uniform intensity. This unusual lighting effect is bound to attract the attention of a person positioned to the rear of the automobile and if that person is in an approaching car, he will immediately take steps to avoid any possible collision.

The hanger bracket 20 has its lower portion bifurcated as indicated at 24 for adjustably fastening the structure extending from this bracket to the rear portion of the vehicle, so as to position properly the device thereon as may be determined by the user. Usually the device will be positioned at about the same location as the ordinary stop light for which it is a substitute.

It is apparent that the motor 1 will continue to run and the lights 8 will remain incandescent as long as the brake pedal or brake lever is operated so that on release of the pedal or lever the motor stops and the illumination is shut-off at the brake switch. Thus, the improved stop light consumes very little if any, more energy than the ordinary stationary or swinging form of stop light, indeed, in view of the fast rotary motion of the bulbs 8, the latter may actually be made smaller than the bulb that is normally used in the ordinary stop light. It is apparent that th bulbs 8 may be colored in any selected hue and if desired the bulbs may all have different colors so as to give a varied lighting effect as they rotate.

In Figures 4 to 6 inclusive, there is shown a modification of the device wherein the blades or arms 25 of the rotating member 26 are tubular, propeller shaped and made from transparent material for emitting light. The member 26 is secured to the motor shaft by the set screw 6 and is provided with an enlarged portion indicated at 27 having a conical configuration and terminating in a shoulder 28. The shouldered portion contains a large recess 29 for receiving a lamp bulb 30. There is a removable nose portion 31 provided with a plurality of shoulders and adapted snugly to be received by the shoulder 28 of the rotating member and to which it is secured by a set screw 32. This nose portion is provided with an inverted centrally disposed recess 33 which receives a circular member 34 of insulating material. This member has a circular recess provided with threads for receiving the threaded socket of the bulb 30. A plug or pin 35 extends through the metal nose portion 31 to contact the central contact member of the bulb in order to ground this member. A lead 36 is taken from the socket of the bulb to a contact ring 37 which is insulatingly secured as indicated at 38 to the rear surface of a shouldered portion 39 of the rotating member 26. A brush 17 is adapted to bear against the contact ring as was explained in connection with Figure 3 in order to bring electrical energy from the battery through the brake switch to the ring and from thence to the bulb 30.

The entire stop light structure as in the case of Figure 1 may be secured at any suitable position to the rear of the automobile by means of a bifurcated hanger 20.

As the motor 1 is caused to rotate as when the brake pedal or lever is operated to close the switch 39' and energy is simultaneously applied from the battery to the bulb 30, the rotation of the member 26 causes the propeller shaped blades 25 to turn at a fast speed and the light emanating from the bulb 30 is propagated through the interior of the blades and projected outwardly through the transparent material. If desired, the back of the blades 25 may have a silver coating in order to reflect light radially and thus intensify the lighted area formed by the rotating blades. The structure shown in Figures 4 to 6 has the advantage over that illustrated in Figures 1 to 3 in that it employs only a single bulb, perhaps of somewhat larger wattage than the bulbs 8, and in addition, the bulb 30 is completely enclosed and therefore thoroughly protected.

In Figures 7 to 9 inclusive, a different arrangement of the light bulb is effected and greater simplicity in the replacement of the bulb is obtained. The brush or shoe arrangement 17 is also discarded. Referring to these figures the motor as illustrated is of the split casing type as indicated by the parting line 40, the two parts being connected together by stay bolts 41. The armature and field windings of the motor have been eliminated for simplicity's sake and as in the case of the preceding figures, one end of the armature and field is grounded and the other end is brought out through the casing at 42. A convenient manner in which the entire windings can be grounded is by the use of an internal lug (not shown), preferably positioned at the parting line 40 where it will be readily accessible. This lug receives a bolt 43 to which the ground lead of the field and armature can be connected as indicated at 44. By placing this ground lead within the casing considerable protection is afforded. An outwardly extending cap 45, preferably made of thermo-setting plastic may be employed, this cap having a centrally disposed recess 46 containing an L-shaped metal member 47 which is screwed to the cap 45 as indicated at 48. The lead 42 from the motor armature and field is also secured to the screw 48 and from the latter, a heavy conductor 49 is taken.

There is a tubular insulated member 50 extending lengthwise of the motor and considerably beyond the end base 51. A metal shaft 52 is snugly received by the tubular or sleeve member 50, this shaft bearing at one end against the L-shaped member 47 and at the other end against the centrally disposed plug 53 of a lamp base 54. The envelope 55 of the lamp contains a filament 56 which can be rendered incandescent when battery energy is supplied thereto. The lamp 55 is contained within a nose shaped element 57, preferably made of a thermo-setting plastic or die casting. The member 57 terminates in a flange portion 58, leaving a recess at this position. The shouldered portion 59 of the conically shaped member 60 is received by the recesses and the flange 58 is secured thereto by means of a set screw 61. The conically shaped member 60 terminates in a relatively large boss 62 which is secured to the shaft 52 by means of a set screw 63.

The lamp base 54 is flexibly held in a centrally disposed position by means of a thin metal web 64 which is secured in any suitable manner to the conical member 60 and has an opening which holds the base 54 in a tight, but yieldable position. A compression spring 65 is contained within a recess 66 of the nose element 57 and is interposed between the lamp bulb and that element in order to cushion the envelope 55.

The arms 67, which may take the shape of propeller blades are preferably made of a thermo-setting or other plastic material and are secured in any suitable manner in the nose element. The blades are hollow, but closed at the tips so that the light emanating from the envelope 55 is propagated equally through all of the blades and thence emitted as a wide lighted area when the motor is caused to rotate. By making the blades in the form of a propeller having relatively thin edges only little resistance to air is encountered as the blades are rotated at a fast speed when the brake pedal or brake lever is applied.

The entire structure may be attached to any suitable part of the automobile by means of the hanger 20 as was described in connection with the other figures.

It will be noted that the bulb 55 can be readily replaced if it burns out by simply removing the set screw 61 which will then permit the entire nose element 57 and the blades secured thereto to be bodily removed from the conical member 60. In this manner, the interior of the blades can be readily inspected or cleaned. It is also apparent that if the nose element 57 is depended upon to propagate additional light, the interior of this element can be readily cleaned at the same time that the bulb is being replaced. There are only a few parts to be removed during this replacement or inspection operation so that it is a very simple matter to restore the operativeness of the device on the road.

There are no brushes or conductor shoes employed as the rotary connection is made between the L-shaped member 47 and the shaft 52 which serves the two purposes of constituting a shaft for the motor and also for conducting electrical energy to the plug portion of the lamp. The cap 45 serves to maintain the contact between the member 47 and the shaft 52 so that no loss in voltage is encountered.

While I have shown the arms 25 and 67 as being made of hollow plastic or other transparent material, it is apparent that if desired a solid plastic such as Lucite may be employed and in which the Lucite would serve readily to conduct the light energy through the material itself. Solid plates of light transmitting material could be readily shaped as propeller blades, except that at their inner ends where the blade is not preferably tapered, but instead has a sufficiently wide area to receive the greatest amount of light. In order to intensify the quantity of light actually propagated through the solid plastic material, the interior of the chamber 29 (Figure 6) may be given a highly specular or mirror like surface. It is apparent that the solid plate form of blade lends itself to any special lighting effect as by painting various colors on the blade or by blackening some of the areas of the blade, or in fact, parts of the blade may be thinner than others to give varying degrees of intensity of light.

It will be understood that I desire to comprehend within my invention such modifications as come within the scope of the claims and the invention.

Having thus fully described my invention, what I claim as new and desire to secure by Letters Patent is:

1. A stop signal for a vehicle comprising a rotary power element adapted to be energized by a source of electromotive force, a shaft driven by said element, arms extending radially from said shaft, said arms being transparent and hollow with the openings at the end of the arms presented to said shaft, a lamp for emanating light from a position where the arms converge, the light extending through the interior of the arms outwardly to be propagated to the exterior of the arms, electrical connections to said lamp and rotary power element from the source of electromotive force in the vehicle, said connections including a switch adapted for being actuated to complete said circuit by the braking mechanism of the vehicle, whereby the rotary power element is rotated and the illuminated arms are caused to describe a circular lighted area.

2. A signal device for a vehicle comprising a rotary power element, a shaft driven by said element, a hollow hub carried by said shaft, radially extending arms carried by said hub, the arms being transparent and hollow with their inner ends presented to the interior of the hub, an electric light device within the hub to illuminate the arms, said shaft being in electrical contact at one end with said electric light device and at the other end in contact with a stationary conductor, means including a normally open switch for supplying said element and said conductor with electric energy during the time that the motor vehicle is slowing down or coming to a halt, whereby the rotary power element and the electric light device are energized during this period and a circular lighted path is produced which serves as a signal.

3. A signal device for a vehicle comprising a rotary power motor, a shaft driven by said motor, a casing secured to said shaft and containing an electric light device, radially extending arms carried by said casing, said arms being constituted of transparent material and presented endwise to said electric light device, an electric circuit for supplying energy to said motor and to said device, a normally open switch in said circuit adapted for being closed when the vehicle is slowing down or is coming to a halt, said circuit including the shaft which contacts at one end with a terminal of the electric light device and at the other end with a charged stationary contact member.

4. A signal device for a vehicle comprising a rotary power element, a shaft therefor passing through said element, a casing secured to one end of said shaft and containing an electric light device, radially extending arms carried by said casing, said arms being hollow, constituted of transparent material and shaped flatwise approximating that of a propeller, said arms being presented endwise to said electric light device, an electric circuit for supplying energy to said element and to said device, said circuit including the shaft which contacts at one end with a terminal of the electric light device and at the other end with a stationary contact member, said member being charged only when the vehicle is slowing down or is coming to a halt.

5. A signal device for a vehicle comprising an electric motor, a shaft passing through the center of said motor and extending beyond the motor at each end, the casing secured to the shaft and containing an electric light device, said device being flexibly mounted within said casing and the bulb portion of the device being directed away from said motor, radially extending arms carried by said casing, said arms being constituted of transparent material and presented endwise to said electric light device, an electric circuit for supplying energy to said motor and to said device, said circuit including said shaft, which contacts at one end with a terminal of the electric light device and at the other end with a stationary contact member which is charged during the time that the vehicle is slowing down or is coming to a halt.

6. A signal device for a vehicle comprising a rotary power motor, a shaft driven by said motor, a casing secured to said shaft and containing an electric light device, radially extending arms carried by said casing, said arms being constituted of a light propagating material and presented endwise to said electric light device, an electric circuit for supplying energy to said motor and to said device and including a normally open switch, and means for closing said switch when the vehicle is slowing down or is coming to a halt.

7. A signal device for a vehicle comprising a rotary power motor, a shaft driven by said motor, a casing of light transmitting material secured to said shaft and containing an electric light device, blades of light transmitting material projecting radially from said casing and having shape to reduce wind resistance, said blades being presented endwise to the electric light device, and an electric circuit for selectively supplying energy to said motor and to said device.

HENRY J. BEEMER.

REFERENCES CITED

The following references are of record in the file of this patent:

UNITED STATES PATENTS

| Number | Name | Date |
| --- | --- | --- |
| 505,097 | Flint | Sept. 19, 1893 |
| 1,188,118 | Tregoning | June 20, 1916 |
| 1,344,084 | Hackett | June 22, 1920 |
| 1,712,092 | Samminiatelli | May 7, 1929 |
| 1,772,499 | Rumsey | Aug. 12, 1930 |
| 1,751,018 | Signor | Mar. 18, 1930 |